Patented June 5, 1928.

1,672,292

UNITED STATES PATENT OFFICE.

GOTTLIEB ZIMMERLI, OF AARBURG, SWITZERLAND.

WETTING AND DEGREASING AGENT.

No Drawing. Application filed June 15, 1925, Serial No. 37,383, and in Switzerland June 27, 1924.

The invention relates to the manufacture of a stable and resistant wetting and degreasing agent which consists of a neutralized mixture of a highly sulfonated fat or oil having a sulfo-acid amount of at least 40 per cent of the whole fat contents, with a water insoluble hydrogenated phenol. The stability of the agent against hard water, for example against calcium and magnesium salts, against organic and inorganic acids, such as sulfuric acid, acetic acid, and salts, which increases with the percentage of sulfo-acid, is greatly improved with respect to known agents of this kind.

By the addition of the highly sulfonated oil to water insoluble hydrogenated phenol, such as hydrogenated cresol, the wetting and dissolving power of which is advantageously known with respect to oils and fats of all kinds, a wetting and degreasing agent clearly soluble in water will be obtained, which constitutes a very useful universal expedient in the textile industry. It may be convenient, in view of obtaining the necessary viscosity, to add to the mixture an alkali salt of the group of the nonsaturated fatty acids, such as oleine acid ($C_{17}H_{33}COOH$). The obtained product shows a surprising power of resistance against lime and magnesia, salts, acids and alkali lyes.

As hydrogenated phenol I may use the mixture of the three isomer methylcyclohexanols as well as each of the isomers individually.

*Example.*

I prepare a sulfonated castor oil having a sulfo-acid amount of about 45 per cent of the total fat contents and then mix 25 kilos thereof with 35 kg. of hydrogenized raw cresol. To the solution thus obtained I add 15 kilos of oleine which has previously been saponified by means of 4 kilos of a caustic potash solution. This mixture is thereupon neutralized with caustic potash and gives thus, mixed with water, a clear solution which is characterized by the aforesaid good stability as well as by its great emulsifying, degreasing and cleaning power.

What I claim is:

1. A wetting and degreasing agent, consisting of a neutralized mixture of a highly sulfonated fat having a sulfo-acid amount of at least 40 per cent of the whole fat contents with a water insoluble hydrogenated cresol.

2. A wetting and degreasing agent, consisting of a neutralized mixture of a highly sulfonated fat having a sulfo-acid amount of at least 40 per cent of the whole fat contents, a water insoluble hydrogenated cresol and an alkali salt of a nonsaturated fatty acid.

In witness whereof I have hereunto signed my name this 4th day of June, 1925.

GOTTLIEB ZIMMERLI.